(12) United States Patent
Iohara et al.

(10) Patent No.: US 12,509,139 B2
(45) Date of Patent: Dec. 30, 2025

(54) ELECTRIC ROTATING MACHINE APPARATUS AND ELECTRIC POWER STEERING APPARATUS

(71) Applicant: Mitsubishi Electric Corporation, Tokyo (JP)

(72) Inventors: Satoshi Iohara, Tokyo (JP); Yusuke Kobayashi, Tokyo (JP); Wataru Ozaki, Tokyo (JP); Yoshikuni Tomioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 691 days.

(21) Appl. No.: 17/909,222

(22) PCT Filed: Mar. 27, 2020

(86) PCT No.: PCT/JP2020/013926
§ 371 (c)(1),
(2) Date: Sep. 2, 2022

(87) PCT Pub. No.: WO2021/192203
PCT Pub. Date: Sep. 30, 2021

(65) Prior Publication Data
US 2023/0150568 A1 May 18, 2023

(51) Int. Cl.
*B62D 5/04* (2006.01)

(52) U.S. Cl.
CPC .................. *B62D 5/0406* (2013.01)

(58) Field of Classification Search
CPC ...... B62D 5/0406; H02K 11/01; H02K 11/33; H02K 5/225
See application file for complete search history.

(56) References Cited

U.S. PATENT DOCUMENTS

| 12,294,267 B2 * | 5/2025 | Motoishi ................ H02K 5/225 |
| 2011/0018374 A1 | 1/2011 | Yamasaki et al. |

(Continued)

FOREIGN PATENT DOCUMENTS

| EP | 3 512 078 A1 | 7/2019 | |
| JP | 5435284 B2 | 3/2014 | |
| WO | WO-2022038650 A1 * | 2/2022 | ........... B62D 5/0406 |

OTHER PUBLICATIONS

International Search Report for PCT/JP2020/013926 dated, Jun. 23, 2020 (PCT/ISA/210).

(Continued)

*Primary Examiner* — Christopher M Koehler
*Assistant Examiner* — Ethan Nguyen Vo
(74) *Attorney, Agent, or Firm* — Sughrue Mion, PLLC

(57) ABSTRACT

In an electric rotating machine apparatus according to the present disclosure, there is adopted a structure in which an extending portion of a control circuit board on which a power module for supplying electric power to windings and a driving circuit for the power module are mounted passes through an external-connection opening portion of an electromagnetic shield and then is connected with connectors. A filter circuit 11 is mounted on the extending portion of the control circuit board so as to secure noise-removal capability. Because a conventional dedicated wiring board for mounting the filter circuit thereon is not required, the foregoing structure can contribute to downsizing and cost reduction. In addition, the foregoing structure can contribute to downsizing and cost reduction of an electric power steering apparatus equipped with the electric rotating machine apparatus according to the present disclosure.

9 Claims, 6 Drawing Sheets

(56) References Cited

U.S. PATENT DOCUMENTS

| | | |
|---|---|---|
| 2012/0098361 A1 | 4/2012 | Yamasaki et al. |
| 2012/0098365 A1 | 4/2012 | Yamasaki et al. |
| 2012/0098366 A1 | 4/2012 | Yamasaki et al. |
| 2012/0098391 A1 | 4/2012 | Yamasaki et al. |
| 2012/0104886 A1 | 5/2012 | Yamasaki et al. |
| 2019/0207488 A1 | 7/2019 | Ichikawa et al. |

OTHER PUBLICATIONS

Extended European Search Report dated Apr. 12, 2023 in European Application No. 20927781.3.

* cited by examiner

ELECTRIC ROTATING MACHINE APPARATUS AND ELECTRIC POWER STEERING APPARATUS

CROSS REFERENCE TO RELATED APPLICATIONS

This application is a National Stage of International Application No. PCT/JP2020/013926 filed Mar. 27, 2020.

TECHNICAL FIELD

The present disclosure relates to an electric rotating machine apparatus and an electric power steering apparatus.

BACKGROUND ART

In an electric rotating machine apparatus in which in the axial direction of the output axle of a conventional electric rotating machine, the electric rotating machine and a control unit are integrated with each other in such a way as to be adjacent to each other, there exists a structure in which a stator, a rotor, and the like are contained in the case of the electric rotating machine and in which the control unit is assembled close to the electric rotating machine in a multi-layered manner. In addition, there has been disclosed an apparatus in which in consideration of redundancy, two groups of winding sets of an electric rotating machine are provided and in which two groups of so-called inverter circuits for driving the two groups of winding sets are also provided separately from each other (for example, Patent Document 1).

CITATION LIST

Patent Literature

Patent Document 1: Japanese Patent No. 5435284

In an electric rotating machine apparatus in which an electric rotating machine and a control unit are integrated with each other in such a way as to be adjacent to each other in an axial direction of the output axle of the electric rotating machine, voltage noise is generated in an inverter for driving the electric rotating machine, an inverter driving circuit, and the like. The generated voltage noise travels in a power source for the electric rotating machine apparatus, a signal terminal, and a board and then propagates to the outside of the electric rotating machine apparatus through a connector. Alternatively, the generated voltage noise travels in a heat sink and the case of the electric rotating machine and then propagates to the outside of the electric rotating machine apparatus through the flange of the electric rotating machine. Accordingly, in order to prevent the noise from propagating to the outside of the electric rotating machine apparatus, a filter circuit and an electromagnetic shield for attenuating the noise are required.

It is desirable that a power module such as the inverter for driving the electric rotating machine and a driving circuit for driving the power module are arranged near to the electric rotating machine so that the wiring leads therefor are shortened. Accordingly, the power module and a control circuit board on which the driving circuit for driving the power module are mounted are arranged adjacently to each other. In addition, it is required that the filter circuit is disposed close to the opening portion of the shield in order to prevent noise from being superimposed again on the wiring lead in which noise has been attenuated. Therefore, with regard to the filter circuit, it is required that a dedicated wiring board—on which the filter circuit is mounted and that is separated from the control circuit board on which the inverter driving circuit is mounted—is disposed close to the opening portion of the shield. It has been a hindrance to downsizing and cost reduction of an electric rotating machine apparatus to provide the dedicated wiring board. Accordingly, it has been a hindrance also to downsizing and cost reduction of a power steering apparatus provided with the electric rotating machine apparatus.

SUMMARY OF INVENTION

Therefore, the objective of the present disclosure is to obtain an electric rotating machine apparatus that requires no dedicated wiring board on which the filter circuit is mounted and that is provided with a filter circuit having a high noise-removal capability and to obtain an electric power steering apparatus provided with such the electric rotating machine apparatus.

Solution to Problem

An electric rotating machine apparatus according to the present disclosure includes
an electric rotating machine having a rotation axle and windings,
a power module that is disposed at one axial-direction side of the rotation axle with respect to the electric rotating machine, that is fixed to the electric rotating machine, and that supplies electric power to the windings of the electric rotating machine,
a control circuit board on which a driving circuit for driving the power module is mounted and that has an extending portion extending toward the one axial-direction side of the rotation axle,
an electromagnetic shield that encloses the power module and the driving circuit and that has an external-connection opening portion through which the extending portion of the control circuit board passes,
an external connection terminal that is disposed outside the electromagnetic shield and is connected with the extending portion of the control circuit board, and
a filter circuit that is mounted on the extending portion of the control circuit board and attenuates noise components propagating to the external connection terminal.
An electric power steering apparatus according to the present disclosure includes the foregoing electric rotating machine apparatus.

Advantage of Invention

In an electric rotating machine apparatus and a power steering apparatus according to the present disclosure, while no dedicated wiring board on which a filter circuit is mounted is required, a filter circuit having noise-removal capability can be provided close to an external-connection opening portion in an electromagnet shield. Accordingly, because no dedicated wiring board for mounting the filter circuit thereon is required, the present disclosure can contribute to downsizing and cost reduction. In addition, the present disclosure can contribute to downsizing and cost reduction of an electric power steering apparatus equipped with the electric rotating machine apparatus according to the present disclosure.

DESCRIPTION OF EMBODIMENTS

Hereinafter, embodiments of the present disclosure will be explained with reference to the drawings.

1. Embodiment 1

Figure 1:
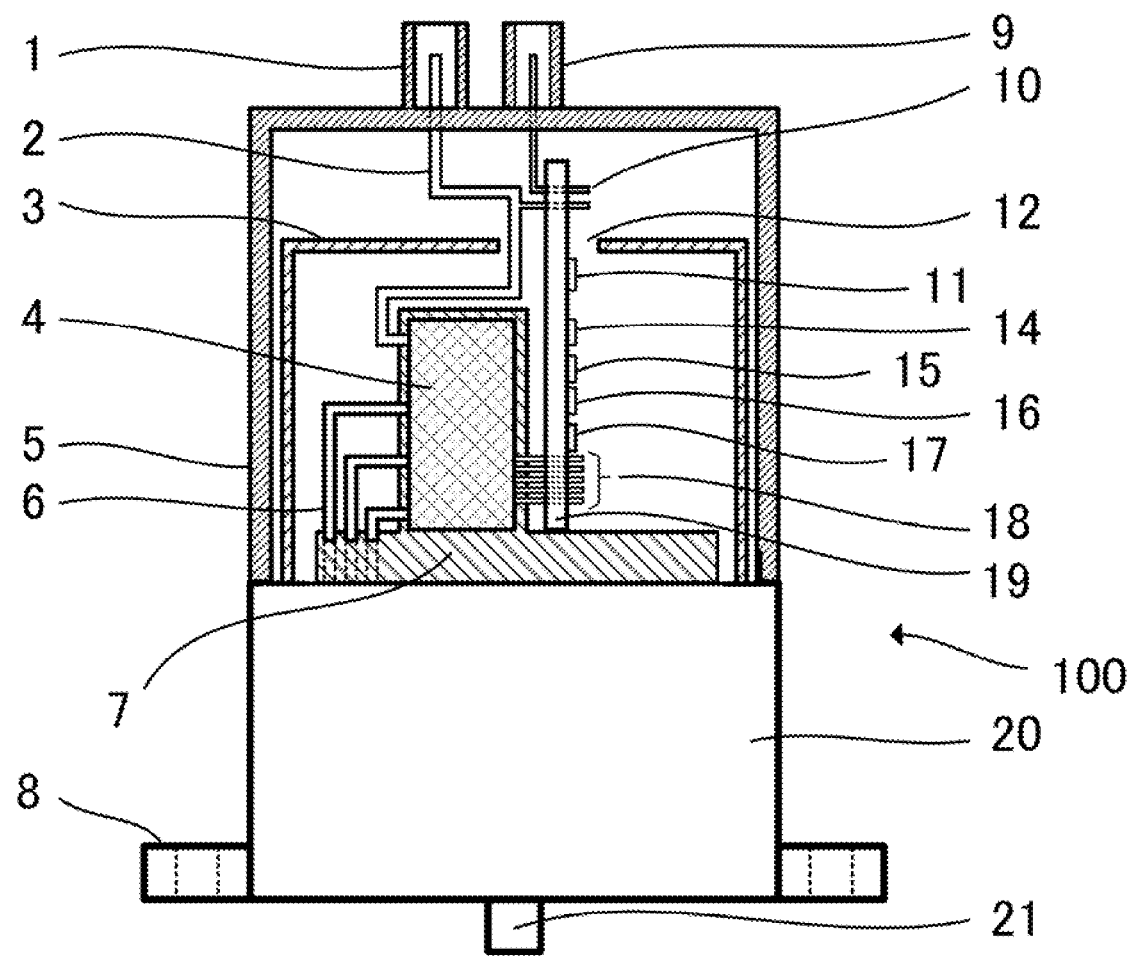
FIG. 1 is an overall configuration diagram of an electric rotating machine apparatus according to Embodiment 1.
Figure 2:
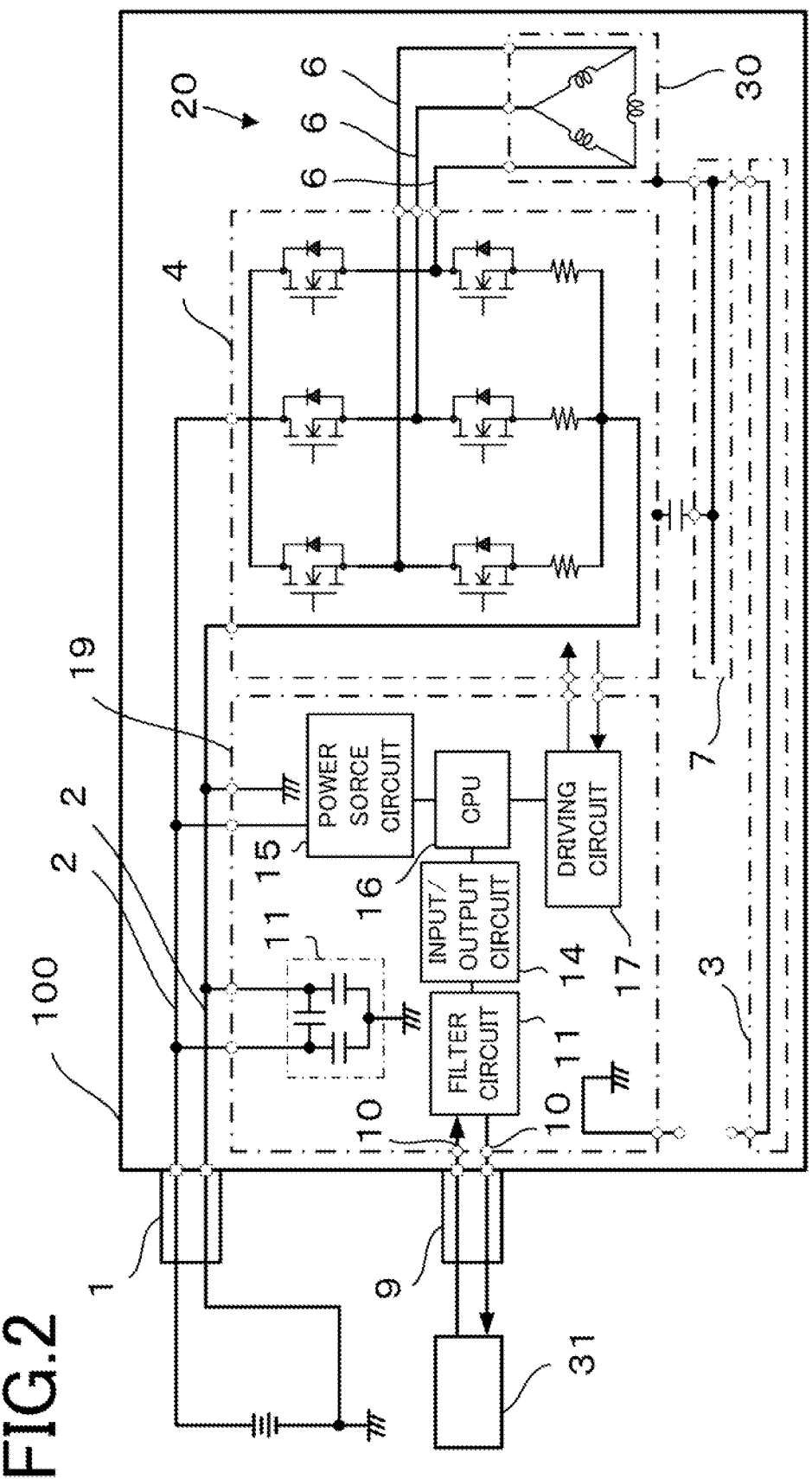
FIG. 2 is a circuit diagram of the electric rotating machine apparatus according to Embodiment 1.

Embodiment 1 will be explained. FIG. 1 is an overall configuration diagram of an electric rotating machine apparatus 100 according to Embodiment 1. FIG. 2 is a circuit diagram of the electric rotating machine apparatus 100 according to Embodiment 1.
<Overall Configuration>

FIG. 1 is a cross-sectional view for explaining the overall configuration of the electric rotating machine apparatus 100. A power-source terminal 2 is incorporated in a power-source connector 1 for supplying a power source from a vehicle battery to the electric rotating machine apparatus 100, so that an electric current is supplied to a power module 4. A signal terminal 10 is incorporated in a signal connector 9 for exchanging signals with the vehicle and is connected with a control circuit board 19. The power-source terminal 2 is also connected with the control circuit board 19 so that a power-source current is also supplied to a power-source circuit 15 mounted on the control circuit board. The electric rotating machine apparatus 100 may be either the one in which a control circuit and a Y-connected or delta-connected three-phase brushless motor are integrated with each other or the one that has a function of utilizing regenerative electric power, generated by being driven by a load, for charging a battery. The electric rotating machine apparatus 100 is utilized not only in an electric power steering apparatus 150 but also in various uses including vehicle-wheel driving.

In the present embodiment, the control circuit board 19 is a printed wiring board on which the power-source circuit 15, an input/output circuit 14, a CPU 16, a driving circuit 17, and a filter circuit 11 are mounted. The power-source circuit 15 is supplied with a power-source current by the power-source terminal 2 connected with the control circuit board 19 and then supplies constant-voltage electric currents to the respective circuits mounted on the control circuit board 19. Through the signal terminal 10, a vehicle sensor 31 supplies vehicle information items such as steering angle information, steering torque information, and vehicle speed information. Input signals are transferred to the CPU 16 by way of the input/output circuit 14. The CPU 16 calculates information to be outputted in accordance with input information and then controls the driving circuit 17. The output signal of the driving circuit 17 is transferred from a driving-signal terminal 18 connected with the control circuit board 19 to the power module 4; then, the power module 4 supplies electric power to windings 30 of an electric rotating machine 20 through power-supply terminals 6.

When the electric rotating machine apparatus 100 is driven, noise is generated in the power module 4 and the driving circuit 17 for driving the power module 4. In order to reduce the noise, an electromagnetic shield 3 is provided. The tubular peripheral portion of the bottomed tubular electromagnetic shield 3 is connected with the electric rotating machine 20 and encloses the power module 4 and the driving circuit 17 for driving the power module 4. An external-connection opening portion 12 is provided in the bottom portion of the electromagnetic shield 3.

The control circuit board 19 has an extending portion that extends toward the side opposite to the output axle 21 of the electric rotating machine 20. The extending portion of the control circuit board 19 passes through the external-connection opening portion 12 in the electromagnetic shield 3 and is connected with the power-source terminal 2 and the signal terminal 10. The filter circuit 11 is mounted at a position, on the control circuit board 19, that is before the connection portion between the control circuit board 19 and each of the power-source terminal 2 and the signal terminal 10; the filter circuit 11 cuts off propagation of noise to the outside.

The power module 4 is cooled by a heat sink 7; the power module 4 and the heat sink 7 are adhered to each other through the intermediary of a mica sheet or the like in such a way as to be electrically insulated from each other, while heat transfer is secured therebetween. The heat sink 7 is electrically connected with the electric rotating machine 20 so as to have an electric potential the same as that of the electric rotating machine 20.

A control unit, of the electric rotating machine 20, that mainly includes the control circuit board 19, various kinds of circuits and components mounted on the control circuit board 19, the power module 4, and the heat sink 7 is covered with a frame 5 assembled to the electric rotating machine 20 and is connected with the outside through the power-source connector 1 and the signal connector 9. A flange 8 is provided in the electric rotating machine 20; the electric rotating machine apparatus 100 is assembled to a vehicle by means of the flange 8.
<Example of Conventional Apparatus>

Figure 6:
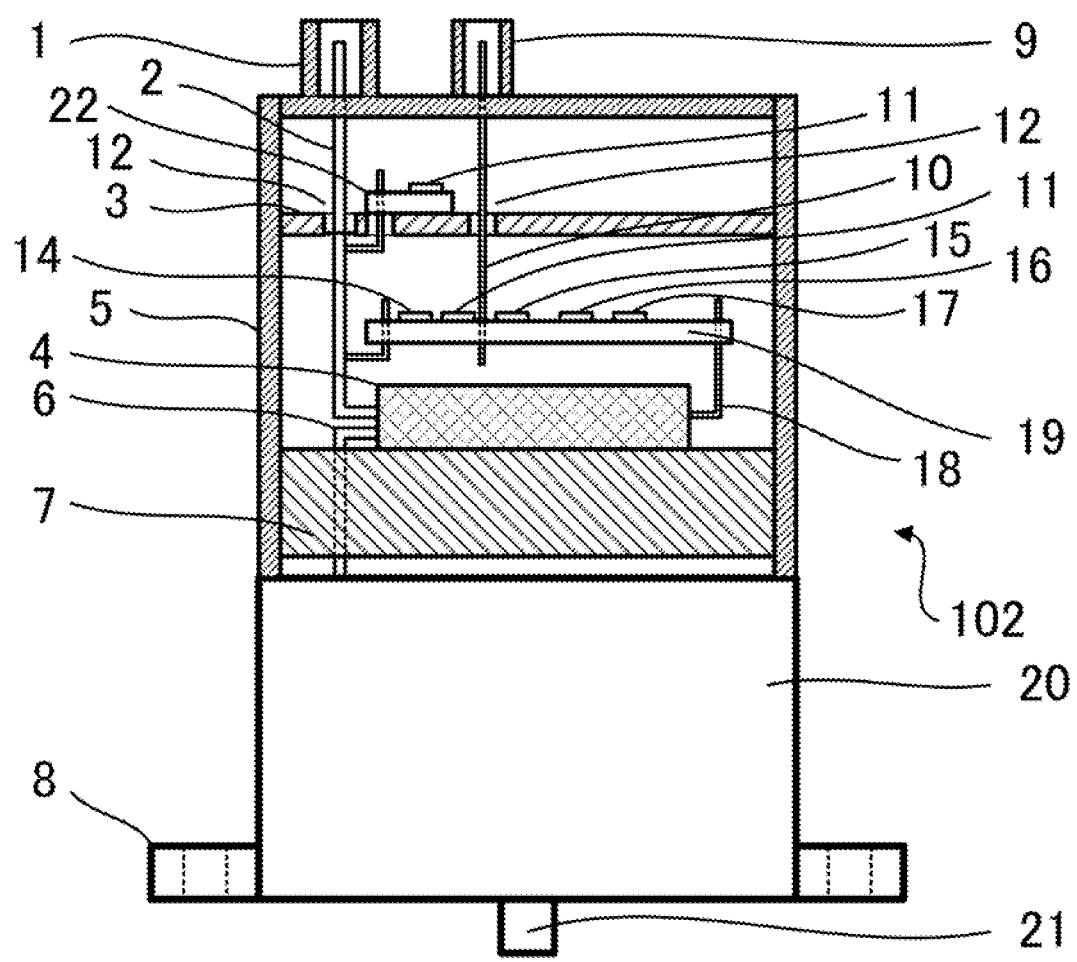
FIG. 6 is an overall configuration diagram of a conventional electric rotating machine apparatus.

Here, a conventional noise countermeasure will be pointed out. FIG. 6 is an overall configuration diagram of an electric rotating machine apparatus 102 as an example of a conventional one.

To date, a noise countermeasure has been implemented by means of such a configuration as illustrated in FIG. 6. In order to reduce noise that propagates from the power-source terminal 2 to the outside of the electric rotating machine apparatus 102 by way of the power-source connector 1, a filter-circuit mounting board 22 that is separated from the control circuit board 19 and on which the filter circuit 11 is mounted has been required.

In addition, the filter circuit 11 for reducing noise that propagates from the signal terminal 10 to the outside of the electric rotating machine apparatus 102 by way of the signal connector 9 is mounted on the control circuit board 19; thus, it has been difficult to dispose the filter circuit 11 close to the external-connection opening portion 12 in the electromagnetic shield 3. Accordingly, because, for example, magnetic noise is superimposed on the signal terminal 10 in which noise has been attenuated by the filter circuit 11, noise cannot sufficiently be attenuated.
<Propagation Mechanism of Noise>

A propagation mechanism of noise generated in the electric rotating machine apparatus 100 will be explained. A major noise source in the electric rotating machine apparatus 100 is the power module 4 for driving the electric rotating machine 20.

In FIG. 1, a power source supplied from the outside of the electric rotating machine apparatus 100 to the power-source connector 1 is supplied to the power module 4 by way of the power-source terminal 2. A signal related to vehicle information transferred from the vehicle sensor 31 by way of the signal connector 9 is transferred to the CPU 16 by way of the input/output circuit 14. The CPU 16 that has calculated the output in accordance with input information controls the driving circuit 17; a driving signal of the driving circuit 17 is transferred to the power module 4 by way of the driving-signal terminal 18; then, the power module 4 supplies an electric current to the electric rotating machine 20 in accordance with the inverter driving signal. When the electric rotating machine 20 is driven, there occur a fluctuation in the power-source voltage supplied to the power module 4 and a change in the current supplied to the electric rotating machine 20; then the respective changes in the voltage and the current become voltage noise and magnetic noise that propagate to the surroundings.

By way of the power-source terminal 2, the signal terminal 10, the control circuit board 19, and the like, voltage noise propagates to the outside of the electric rotating machine apparatus 100 through the power-source connector 1 and the signal connector 9. Moreover, voltage noise propagating from the power-supply terminals 6 passes through the electric rotating machine 20 and then propagates to the outside of the electric rotating machine apparatus 100 through the flange 8 in a mounting portion of the electric rotating machine apparatus 100. Furthermore, because the power module 4 is mounted to the heat sink 7 for heat radiation, voltage noise that has propagated from the power module 4 to the heat sink 7, due to capacitive coupling, passes through the electric rotating machine 20 and then further propagates to the outside of the electric rotating machine apparatus 100 through the flange 8 in the motor mounting portion.

Magnetic noise generated by an electric current supplied to the electric rotating machine 20 is emitted to the periphery of the power module 4. Noise signals generated in the driving circuit 17, the CPU 16, and the power-source circuit 15, which are noise sources other than the power module 4, propagate to the outside of the electric rotating machine apparatus 100 by way or the signal terminal 10 and the control circuit board 19.

<Noise Reduction>

The electric rotating machine apparatus 100 according to the present disclosure is provided with the electric rotating machine 20 having the output axle 21 and the windings 30. Moreover, the electric rotating machine apparatus 100 is provided with the power module 4 that is disposed at the axial-direction anti-output side of the output axle 21 with respect to the electric rotating machine 20, that is fixed to the electric rotating machine 2, and that supplies electric power to the windings 30 of the electric rotating machine 20. Moreover, the electric rotating machine apparatus 100 is provided with the control circuit board 19 on which the driving circuit 17 for driving the power module 4 is mounted and that has the extending portion extending to the axial-direction anti-output side of the output axle 21. Furthermore, the electric rotating machine apparatus 100 is provided with the electromagnetic shield 3 that encloses the power module 4 and the driving circuit 17 and that has the external-connection opening portion 12 through which the extending portion of the control circuit board 19 passes. Moreover, the electric rotating machine apparatus 100 is provided with the power-source terminal 2 and the signal terminal 10 that are arranged outside the electromagnetic shield 3 and are connected with the extending portion of the control circuit board 19. Still moreover, the electric rotating machine apparatus 100 is provided with the filter circuit 11 that is mounted on the extending portion of the control circuit board 19 and that attenuates noise components propagating to the power-source terminal 2 and the signal terminal 10.

The filter circuit 11 is mounted in order to attenuate voltage noise that propagates to the outside of the electric rotating machine apparatus 100 by way of the power-source connector 1, the signal connector 9, and the electric rotating machine 20. It is made possible to reduce emission, to the outside of the electric rotating machine apparatus 100, of noise that is generated and propagates.

Providing the electromagnetic shield 3, the control circuit board 19, and the filter circuit 11 in such a manner as described above makes it possible to effectively remove noise without utilizing any additional board for the filter circuit.

In addition, the electric rotating machine apparatus 100 according to the present disclosure is provided with the heat sink 7 that is situated between the power module 4 and the electric rotating machine 20, performs heat transfer with the power module 4, and has an electric potential the same as that of the electric rotating machine 20. The electromagnetic shield 3 has a bottomed tubular shape; the tubular peripheral portion thereof is connected with the electric rotating machine 20; the bottom portion thereof has the external-connection opening portion 12.

Because the electromagnetic shield 3 is connected with the electric rotating machine 20, noise emission from the electromagnetic shield 3 can be reduced; thus, a high shield effect can be obtained.

In the electric rotating machine apparatus 100 according to the present disclosure, the tubular peripheral portion of the electromagnetic shield 3 is connected with the electric rotating machine 20 or the heat sink 7 at a portion that is closer to the output of the output axle 21 than the heat transfer portion between the heat sink 7 and the power module 4.

Because the electromagnetic shield 3 is connected with the electric rotating machine 20 or the heat sink 7 having an electric potential the same as that of the electric rotating machine 20 at the position that is closer to the electric rotating machine 20 than the assembly position between the heat sink 7 and the power module 4, noise that propagates from the power module 4 to the heat sink 7 does not flow into the electromagnetic shield 3; therefore, a stabilized-potential return path can be obtained and hence a high filter effect can be obtained.

In addition, in the electric rotating machine apparatus 100 according to the present disclosure, the power-source terminal 2 and the signal terminal 10 is connected with the extending portion of the control circuit board 19 at the position that is more outside than the external-connection opening portion 12 of the electromagnetic shield 3.

The electromagnetic shield 3 is provided in order to reduce an effect, of magnetic noise emitted from the power module 4, that is provided to the power-source terminal 2, the signal terminal 10, and the control circuit board 19 that are situated at the positions closer to the power-source connector 1 and the signal connector 9 than the filter circuit 11 inside the electric rotating machine apparatus 100 and in order to reduce the effect to be provided to the outside of the electric rotating machine apparatus 100.

As a result, noise can effectively be removed.

2. Embodiment 2

Figure 3:
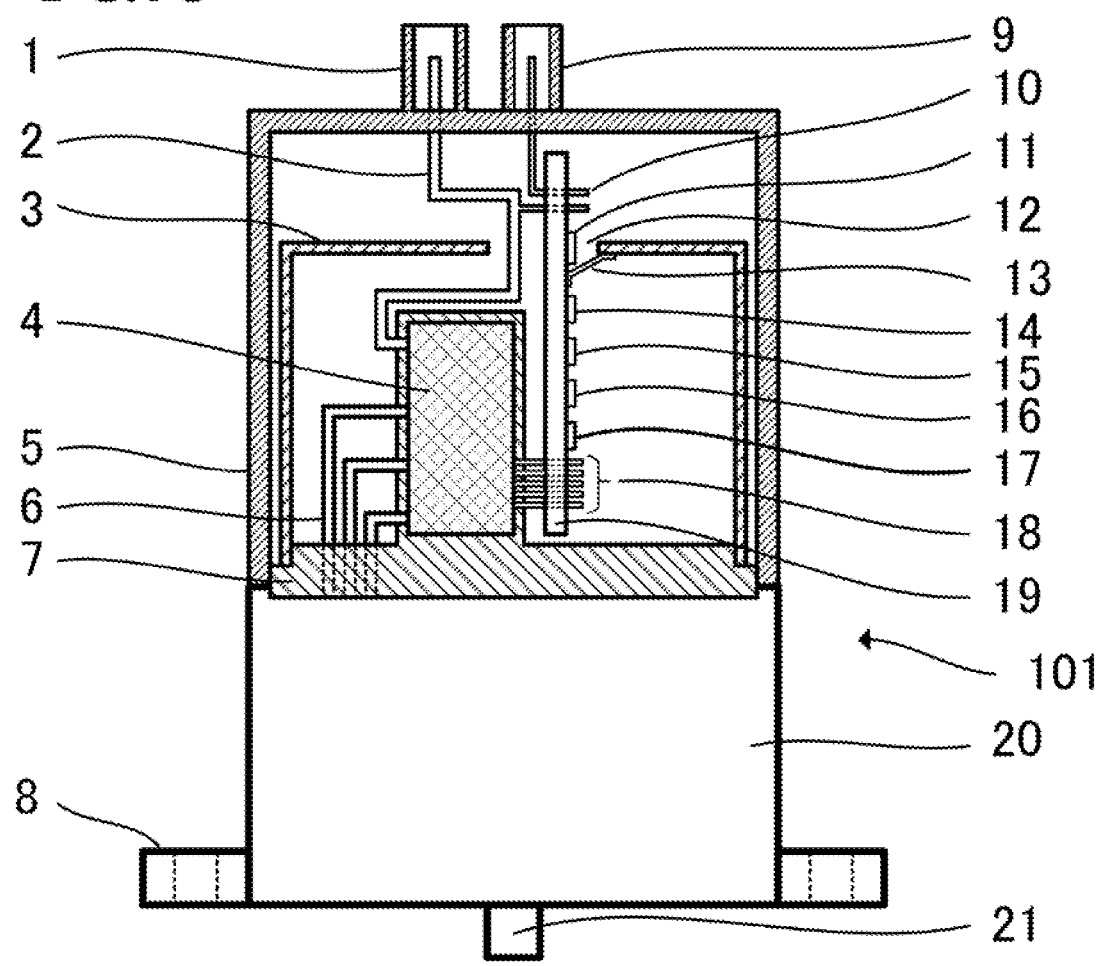
FIG. 3 is an overall configuration diagram of an electric rotating machine apparatus according to Embodiment 2.
Figure 4:
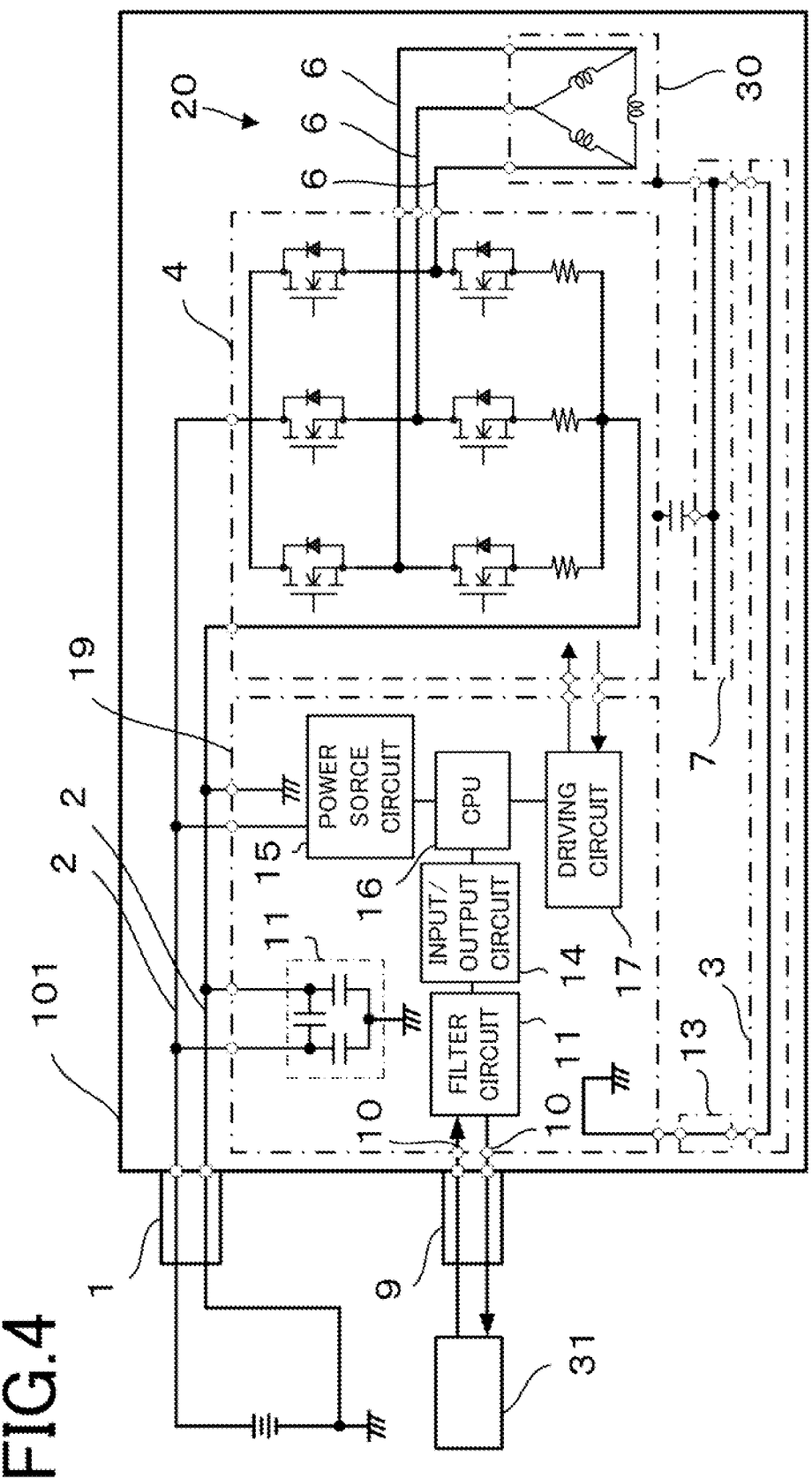
FIG. 4 is a circuit diagram of the electric rotating machine apparatus according to Embodiment 2.

Embodiment 2 will be explained. FIG. 3 is an overall configuration diagram of an electric rotating machine apparatus 101 according to Embodiment 2. FIG. 4 is a circuit diagram of the electric rotating machine apparatus 101 according to Embodiment 2.

FIG. 4, which is the circuit diagram of the electric rotating machine apparatus 101 according to Embodiment 2, is different from FIG. 2, which is the circuit diagram of the electric rotating machine apparatus 100 according to Embodiment 1, only in that one end of a relay member 13 is connected with the electromagnetic shield 3 and the other end thereof is connected with grounding portion of the control circuit board 19.

FIG. 3, which is the configuration diagram of the electric rotating machine apparatus 101 according to Embodiment 2, is different from FIG. 1, which is the configuration diagram of the electric rotating machine apparatus 100 according to Embodiment 1, in the following three points.

(1) The relay member 13 is connected with the external-connection opening portion 12 of the electromagnetic shield 3 and with the periphery of the filter circuit 11 on the extending portion of the control circuit board 19.

(2) The filter circuit 11 is disposed at a position, on the extending portion of the control circuit board 19, that passes through the external-connection opening portion 12 of the electromagnetic shield 3.

(3) The tubular peripheral portion is connected with the heat sink 7 but is not connected directly with the electric rotating machine 20.

<Noise Reduction in Embodiment 2>

In the electric rotating machine apparatus 101 according to the present disclosure, the filter circuit is disposed at the position, on the extending portion of the control circuit board 19, that passes through the external-connection opening portion 12 of the electromagnetic shield 3.

The filter circuit 11 is mounted in order to attenuate voltage noise that propagates to the outside of the electric rotating machine apparatus 101 by way of the power-source connector 1, the signal connector 9, and the electric rotating machine 20. In addition, because the filter circuit 11 is mounted at the position close to the external-connection opening portion 12 of the control circuit board 19 that is disposed in parallel with the output axle 21 and is extended to the position closer to the power-source connector 1 and the signal connector 9 than the external-connection opening portion 12, magnetic noise is not superimposed on the control circuit board 19, the power-source terminal 2, and the signal terminal 10 that are arranged closer to the power-source connector 1 and the signal connector 9 than the filter circuit 11 in which noise has been attenuated; thus, because the front and rear portions with respect to the filter circuit 11 can be separated by the filter circuit 11 and the inner and outer portions with respect to the external-connection opening portion 12 can be separated by the electromagnetic shield 3, a high filter effect can be obtained.

In the electric rotating machine apparatus 101 according to the present disclosure, the filter circuit 11 is connected with the electromagnetic shield 3 by way of the relay member 13.

The filter circuit 11 and the electromagnetic shield 3 are electrically connected with each other by use of the relay member 13, so that the relay member 13 works as a path for returning, to the filter circuit 11, voltage noise that passes through the heat sink 7 and the electric rotating machine 20 from the power module 4 and then propagates to the outside of the electric rotating machine apparatus 101 by way of the flange 8 or voltage noise that passes through the electric rotating machine 20 from the power-supply terminals 6 and then propagates to the outside of the electric rotating machine apparatus 101 by way of the flange 8.

As a result, noise can be suppressed from propagating to the outside.

In the electric rotating machine apparatus 101 according to the present disclosure, the relay member 13 is connected with the external-connection opening portion 12 of the electromagnetic shield 3.

The filter circuit 11 and the electromagnetic shield 3 are electrically connected with each other along the shortest route by use of the relay member 13, so that the relay member 13 efficiently works as a shortest path for returning voltage noise that is to propagate to the outside of the electric rotating machine apparatus 101 to the filter circuit 11.

As a result, noise can effectively be suppressed from propagating to the outside.

In the electric rotating machine apparatus 101 according to the present disclosure, the electric potential of the electromagnetic shield 3 is utilized as the ground potential of the filter circuit 11.

Because the filter circuit 11 and the electromagnetic shield 3 are electrically connected with each other by use of the relay member 13, the electromagnetic shield 3 can be utilized as the ground potential of the filter circuit 11. As a result, the relay member 13 works as a path for returning, to the filter circuit 11, voltage noise that passes through the heat sink 7 and the electric rotating machine 20 from the power module 4 and then propagates to the outside of the electric rotating machine apparatus 101 by way of the flange 8 or voltage noise that passes through the electric rotating machine 20 from the power-supply terminals 6 and then propagates to the outside of the electric rotating machine apparatus 101 by way of the flange 8.

As a result, noise can more effectively be suppressed from propagating to the outside.

In addition, the tubular peripheral portion of the bottomed tubular electromagnetic shield 3 is connected with the heat sink 7; thus, because even when not directly connected with the electric rotating machine 20, the heat sink 7 is electrically connected with the electric rotating machine 20 and hence the electric rotating machine 20 and the heat sink 7 are kept on one and the same electric potential, there can be obtained an effect the same as that at a time when the tubular peripheral portion of the electromagnetic shield 3 is directly connected with the electric rotating machine 20.

3. Embodiment 3

Figure 5:
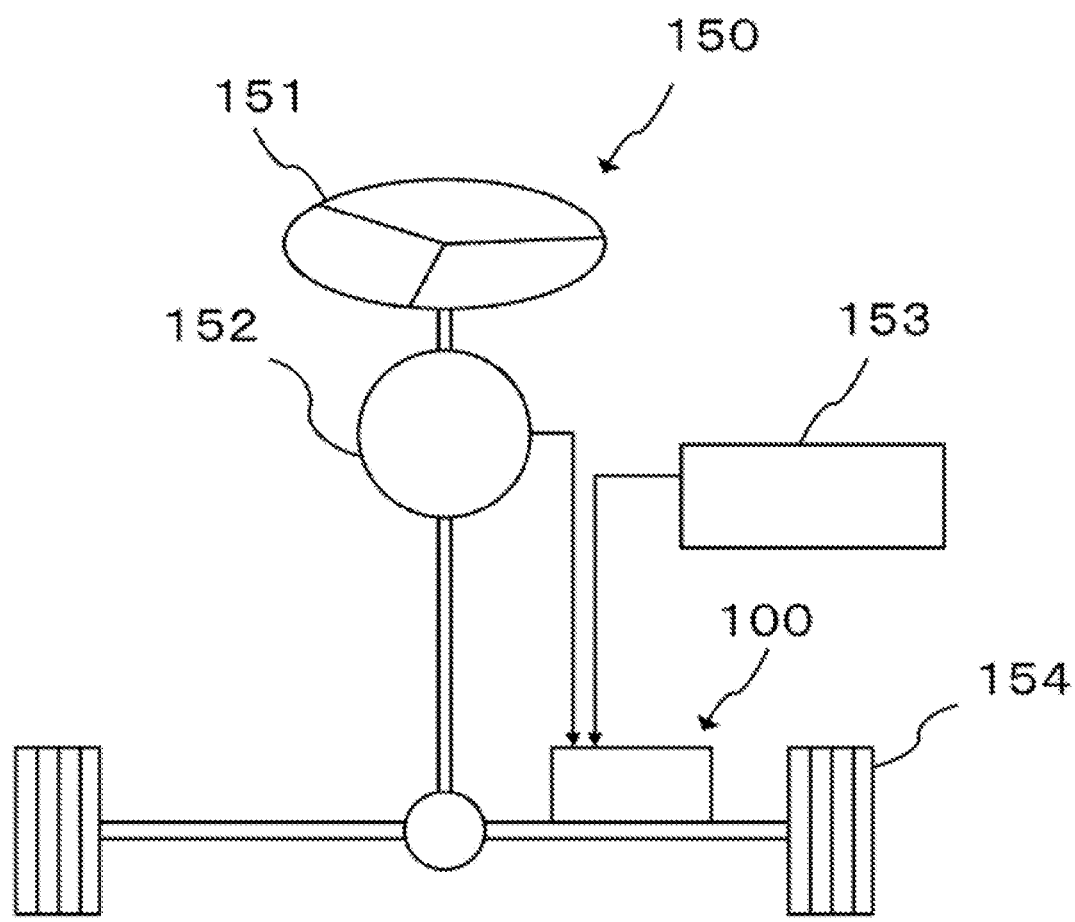
FIG. 5 is a configuration diagram of an electric power steering apparatus according to Embodiment 3.

FIG. 5 is a configuration diagram of an electric power steering apparatus 150 according to Embodiment 3. There will be explained an example in which the electric rotating machine apparatus 100 is applied to the electric power steering apparatus 150 to be mounted in a vehicle.

FIG. 5 is an overall configuration diagram of the electric power steering apparatus 150 and illustrates an example of the rack-type electric power steering apparatus 150. When a driver makes the steering mechanism of a vehicle generate steering torque by means of a steering wheel 151, a torque sensor 152 detects the steering torque and then outputs it to the electric rotating machine apparatus 100. In addition, a speed sensor 153 detects the traveling speed of the vehicle and then outputs it to the electric rotating machine apparatus 100. Based on the inputs from the torque sensor 152 and the speed sensor 153, the electric rotating machine apparatus 100 generates auxiliary torque for supplementing the steering torque and then supplies it to the steering mechanism of front wheels 154 of the vehicle. The torque sensor 152 and the speed sensor 153 are included in the vehicle sensor 31 in FIG. 2. It may be allowed that the electric rotating machine apparatus 100 generates auxiliary torque based on inputs other than the inputs from the torque sensor 152 and the speed sensor 153.

Downsizing of the electric rotating machine apparatus 100 to be applied to the electric power steering apparatus 150 raises the mountability for the vehicle. The cost reduction of the electric rotating machine apparatus 100 results in cost reduction of the whole electric power steering apparatus 150. The same effect can be demonstrated even when instead of the electric rotating machine apparatus 100, the electric rotating machine apparatus 101 is utilized.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present disclosure. For example, there are included the case where at least one constituent element is modified, added, or omitted and the case where at least one constituent element is extracted and then combined with constituent elements of other embodiments.

DESCRIPTION OF REFERENCE NUMERALS

2: power-source terminal
3: electromagnetic shield
4: power module
7: heat sink
10: signal terminal
11: filter circuit
12: external-connection opening portion
13: relay member
17: driving circuit
19: control circuit board
20: electric rotating machine
21: output axle
100, 101: electric rotating machine apparatus
150: electric power steering apparatus

What is claimed is:

1. An electric rotating machine apparatus comprising:
an electric rotating machine having a rotation axle and windings;
a power module that is disposed at a first side of the electric rotating machine along an axial-direction of the rotation axle, that is fixed to the electric rotating machine, and that supplies electric power to the windings of the electric rotating machine;
a control circuit board on which a driving circuit for driving the power module is mounted and that has an extending portion extending toward the first side;
an electromagnetic shield that encloses the power module and the driving circuit and that has an external-connection opening portion through which the extending portion of the control circuit board passes;
an external connection terminal that is disposed outside the electromagnetic shield and is connected with the extending portion of the control circuit board; and
a filter circuit that is mounted on the extending portion of the control circuit board and attenuates noise components propagating to the external connection terminal.

2. The electric rotating machine apparatus according to claim 1, wherein the filter circuit is disposed at a position, on the extending portion of the control circuit board, that passes through the external-connection opening portion of the electromagnetic shield.

3. The electric rotating machine apparatus according to claim 1, further comprising a heat sink that is situated between the power module and the electric rotating machine, performs heat transfer with the power module, and has an electric potential the same as that of the electric rotating machine, wherein the electromagnetic shield has a bottomed tubular shape; a tubular peripheral portion thereof is connected with the electric rotating machine or the heat sink; a bottom portion thereof has the external-connection opening portion.

4. The electric rotating machine apparatus according to claim 3, wherein the tubular peripheral portion of the electromagnetic shield is connected with the electric rotating machine or the heat sink at a portion that is closer to a second side opposite the first side along the axial-direction of the rotation axle than a heat transfer portion between the heat sink and the power module.

5. The electric rotating machine apparatus according to claim 1, wherein the filter circuit is connected with the electromagnetic shield by way of a relay member.

6. The electric rotating machine apparatus according to claim 5, wherein the relay member is connected with the external-connection opening portion of the electromagnetic shield.

7. The electric rotating machine apparatus according to claim 5, wherein an electric potential of the electromagnetic shield is utilized as a ground potential of the filter circuit.

8. The electric rotating machine apparatus according to claim 1, wherein the external connection terminal is connected with the extending portion of the control circuit board at a position that is more outside than the external-connection opening portion of the electromagnetic shield.

9. An electric power steering apparatus having the electric rotating machine apparatus according to claim 1.

* * * * *